United States Patent [19]

Prosenbauer

[11] 4,286,510
[45] Sep. 1, 1981

[54] DEVICE FOR INJECTING A TREATING LIQUID INTO MATERIAL TO BE TREATED

[75] Inventor: Otto Prosenbauer, Vienna, Austria

[73] Assignee: Prosenbauer & Co. Maschinenhandel, Vienna, Austria

[21] Appl. No.: 108,598

[22] Filed: Dec. 31, 1979

[30] Foreign Application Priority Data

Jan. 9, 1979 [AT] Austria .................................. 156/79

[51] Int. Cl.³ .......................... A23L 3/34; A23B 4/00
[52] U.S. Cl. ........................................ 99/533; 99/535
[58] Field of Search .................. 99/494, 532, 533, 535

[56] References Cited

U.S. PATENT DOCUMENTS

| 3,590,721 | 7/1971 | Hoffmann | 99/533 |
| 3,675,567 | 7/1972 | Rejsa et al. | 99/533 |

FOREIGN PATENT DOCUMENTS 342402 4/1978 Austria ...................................... 99/533

Primary Examiner—Billy J. Wilhite
Assistant Examiner—Timothy F. Simone
Attorney, Agent, or Firm—Salter & Michaelson

[57] ABSTRACT

The invention refers to a machine for injecting a treating liquid, particularly brine, into an edible material, particularly meat. The machine comprises a frame in which a conveyor for the material to be treated is positioned which moves the material in horizontal direction so that the material is transported below at least two injection needle sets subsequently. Each injection needle set is resiliently mounted in a needle case which is fixed to an injection frame guided in the machine frame for upward and downward reciprocal movement. To each one of the needle sets a separate treating liquid supply system is associated which comprises a storage tank for the treating liquid, a treating liquid conduit leading from the storage tank to the injection needles and a pump for the treating liquid. Further, for each needle set a separate circuit for collecting the amount of treating liquid ejected from the injection needles but not having passed into the material to be treated, is provided, and the collecting treating liquid is returned after having passed a cleaning filter to the storage tank. The machine enables to treat the material subsequently, simultaneously or alternately by two or more treating liquids so that the kind of treatment can be properly chosen in dependence of the kind of material to be treated.

5 Claims, 3 Drawing Figures

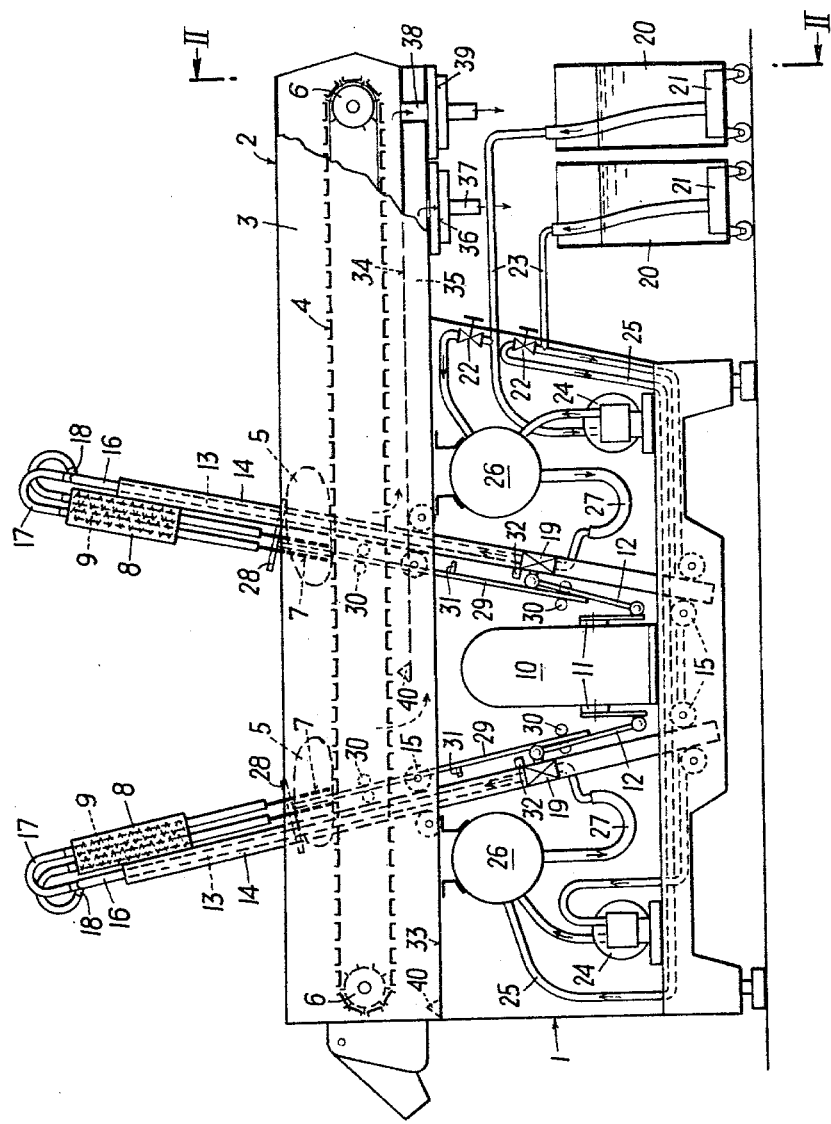
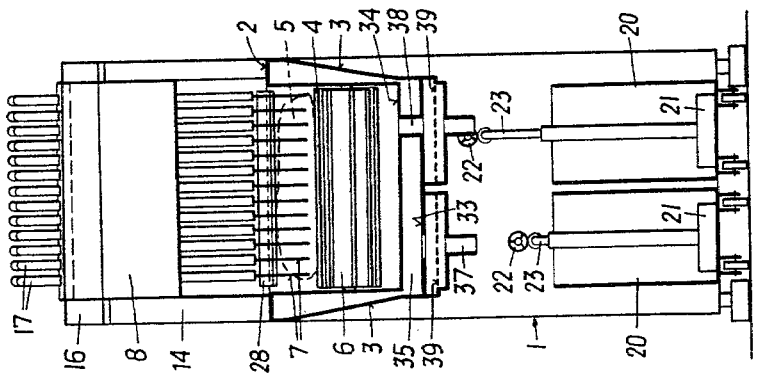

DEVICE FOR INJECTING A TREATING LIQUID INTO MATERIAL TO BE TREATED

BACKGROUND OF THE INVENTION

The invention refers to a device for injecting a treating liquid, particularly brine, into a material to be treated, particularly into meat, comprising at least two sets of injection needles, which needles are supported against the action of springs in a needle case being arranged in a common frame for upward and downward reciprocating movement.

Such devices are known (Austrian Pat. No. 342,402). As a rule, the needles of each needle set are arranged in two rows and eject the treating liquid only with those needles which have entered the meat. This is achieved by means of strippers carried along with the needle cases and contacting the material to be treated on downward movement of the needles, so that the movement of the strippers will be stopped when they contact the meat to be treated, whereas the needles are further moved in downward direction so that they can penetrate into the material to be treated. The resulting relative movement between the needle case and the stripper is used to open a valve interconnected into the supply conduit of the treating liquid and to again close this valve as soon as the needles are extracted from the material to be treated. As soon as the needles are retracted from the meat, the needle case and, respectively, its frame serving for feeding the treating liquid lift the stripper off the material to be treated by means of an abutment.

It has shown in practice that the supply of treating liquid, particularly brine, is subjected to restrictions with respect to time and movements, so that more than a certain amount of treating liquid cannot be injected into the material to be treated with one single needle set within a predetermined unit of time. In a device of the kind described above, this drawback is avoided by arranging two sets of needles in mutually inclined V-arrangement. The meat, being moved step by step through the device on a conveyer belt, is first pickled by the needles of the first needle case, then is further conveyed in forward direction and subsequently is, after a certain distance, again pickled by the needles of the second needle case. By pickling twice the meat there results the essential advantage that per unit of time a greater volume of brine can be injected into the meat, so that for achieving approximately the same level of pickling the meat can be moved through the pickling machine at a greater speed. Thus, the output per hour of pickled meat can be substantially increased. The oblique or V-shaped arrangement of the needle cases and therefor also of the pickling needles provides, in comparison with a vertical arrangement of the pickling needles, the advantage that the needles of the first needle case penetrate into the meat from one side in an inclined direction, whereas the needles of the second needle case penetrate into the meat from the other side, preferably in a mirror-image relative to the needles of the first needle case, i.e. with the same angle of inclination relative to the horizontal supporting surface for the meat formed by the conveyor belt. Thus, the needles of the second needle case are reliably prevented from penetrating into the meat at the same location as have penetrated the needles of the first needle case. Furthermore, the penetration path into the meat as a rule is substantially longer for an obliquely moved needle than for a needle moved in vertical direction, so that the pickling needle has a longer residence time within the meat which enables to inject a greater amount of brine into the meat than with a vertical arrangement of the needles. By arranging both needle sets according to a V-shaped arrangement, the component of force exerted by one of both needle sets on the meat and, respectively, the device in horizontal direction is compensated by the component of force exerted by the other needle set. In practice it has further shown that when the needles of both needle cases are introduced according to a V-shaped pattern, the meat is subjected to a tenderizing action and the quality of the pickled meat is thus substantially improved.

OBJECTS AND SUMMARY OF THE INVENTION

It is an object of the present invention to further improve a device of the type initially described and more particularly, to make such a device more versatile and universal in use.

It is a further object of the invention to provide for a pickling machine with which the goods to be pickled can be treated with more than one pickling liquid.

It is another object of the invention to make a pickling machine of the kind above more reliable in use.

The invention essentially consists in that for each needle set there is provided a separate supply system for treating liquid, said system comprising a storage container, a suction conduit and a pump. Whereas in the known device of the kind described above, both needle sets are supplied with one and the same treating liquid via a common supply conduit and by means of a common pump, each needle set is now, in accordance with the invention, supplied with a treating liquid independently from the other needle set or needle sets, respectively. This results in the advantage that for each needle case a separate injection liquid or brine can be taken in consideration so that it becomes possible to operate the device simultaneously or in alternating manner with two or more treating liquids of different composition or quality, respectively.

A further advantage of a device according to the invention resides in the fact that the inventive device becomes more independent from troubles within the supply system for the treating liquid. While such a trouble within the supply system will make inoperative the whole device of the kind initially described, such troubles will, in a device according to the invention, make inoperative only that supply system in which the troubles occur and will not make inoperative the supply system for treating liquid of the other needle sets. Repair work on the disturbed supply system becomes thus also possible in a device still operating.

According to a preferred embodiment of the invention the arrangement is such that each supply system for treating liquid is provided with a circuit for that treating liquid which was ejected from the needles but has not passed into the material to be treated, noting that below each needle set a separate collecting means for treating liquid is arranged and is separated from the collecting means for treating liquid coordinated to the other needle sets, a return conduit leading to the appertaining storage container being connected to each collecting means. This provides the possibility to separately collect excess brine for each needle set separately and to circulate this brine so that losses in brine are avoided for all needle sets and for all supply systems for treating liquid, respectively. Various kinds of treating liquid can thus be used for the various needle sets without losses in treating liquid.

According to a preferred embodiment of the invention, the collecting means for the treating liquid is formed of a vat which surrounds with two lateral walls at least one conveyor belt for the material to be treated and is provided with a plurality of superimposed bottoms being in number equal to the number of needle sets and being upwardly bent at their front ends. Between two needle sets terminates one of these bottoms and, preferably, the interspace between two adjacent bottoms is connected to the respective return conduit. This arrangement provides a particularly simple and synoptical construction in which the lateral walls of the vat are common for all collecting means. If the interspace between the adjacent bottoms is connected to the respective return conduit, the bottoms simultaneously form together with the lateral walls part of the respective return conduits which then can be directed to one and the same side of the machine without difficulties. This provides the possibility to arrange the storage containers for all treating liquids at the same front end of the machine, noting that the treating liquids are fed via filters to the respective storage containers arranged at this front end. This arrangement is space-saving and easy to manipulate because all storage containers are accessible from one and the same side of the machine. By filtering the brine flowing back it is avoided, in a manner known per se, that contaminated brine is ejected.

As already mentioned, a device according to the invention provides the possibility to use for each needle case an individual injection brine so that, for example, two kinds of brine can be used which differ in composition and quality. It is for example possible to use one kind of brine for the first needle case and to inject this brine in an amount of approximately 8 percent by volume of the meat volume and to pickle the meat by means of the second needle case with 20 percent by volume of the meat volume of a brine of another composition. If, according to the invention, each needle set can be stopped in its lifted position independently of the other needle sets and if the respective supply conduit for treating liquid can be closed independently of the other supply conduits, the device can selectively be operated with only one needle set or optionally with some of the needle sets. The needle sets not used are then fixed in their lifted position and thus do not obstruct movement of the material to be treated. In this case, the needle sets not operated are not supplied with treating liquid.

In this case, it is of particular advantage to provide each supply system with a separate pressure control means for the treating liquid because this provides the possibility to influence the amount of brine injected per unit of time via each needle set by controlling the supply pressure of the brine.

DESCRIPTION OF THE DRAWINGS

In the accompanying drawings two embodiments of a device according to the invention are schematically shown by way of example.

FIG. 1 is a side elevational view of a device comprising two needle sets arranged in a V-shaped pattern.

FIG. 2 is a sectional view taken along line II—II of FIG. 1; and

Figure 3:
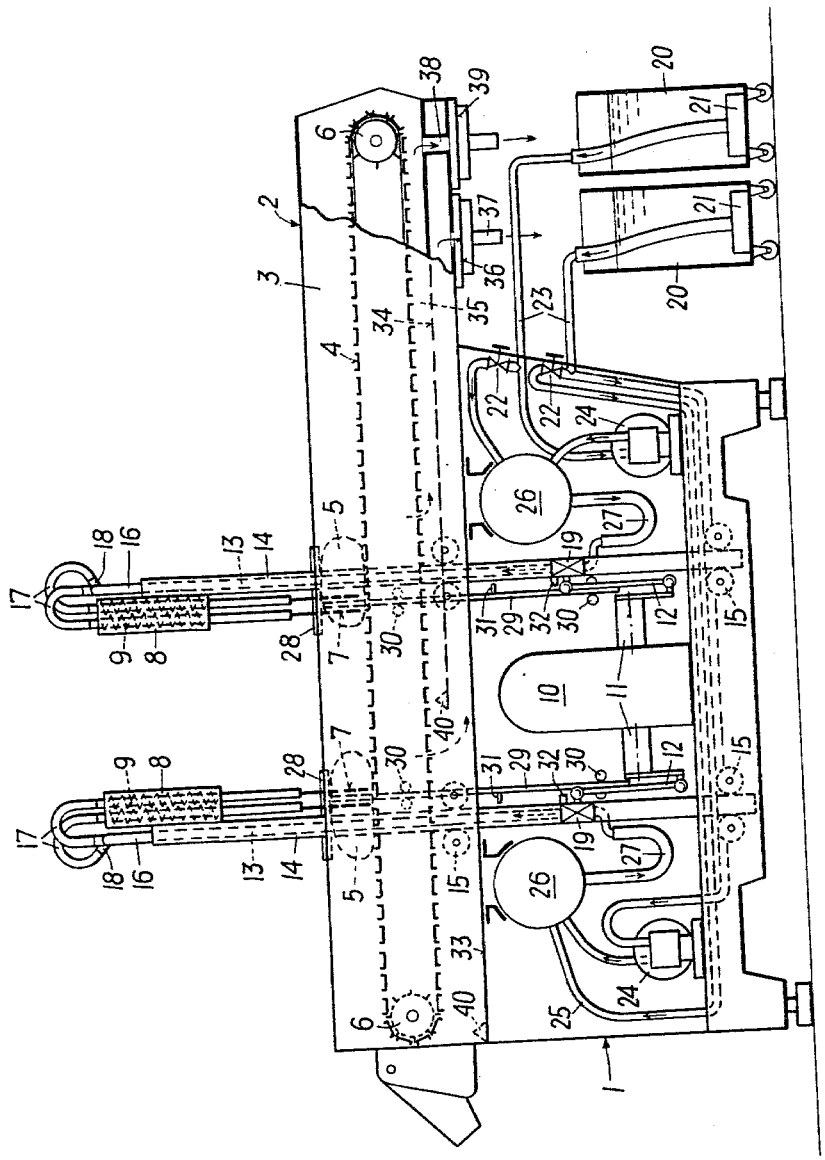
FIG. 3 is a side elevational view of a modified embodiment comprising two vertically arranged needle sets.

The pickling machine shown in FIGS. 1 and 2 has a frame 1 carrying in its upper part a trough-shaped collecting vat 2 for injected brine, said vat having two lateral walls 3 between which a stepwisely moved conveyor belt 4 for the meat 5 to be pickled is guided around rollers 6. Pickling of the meat 5 is effected by means of two sets of injection needles 7 and each of the needle sets is supported within a needle case 8 against the action of springs 9 for being moved in longitudinal direction of the needles relative to the case 8. This arrangement is known per se for example from the U.S. Pat. No. 3,590,721 granted to L. A. Hoffmann, and prevents the needles from becoming broken when contacting a bone within the meat. The needle cases 8 are moved in upward and down-ward direction by a drive means to be later described in detail. The conveyor belt 4 is advanced only if both needle cases 8 are in the upper dead-point position to make sure that the needles are completely extracted from the meat if the meat is to be advanced. The needles 7 together with their resilient given by the springs 9 are length-adjustably supported within the needle cases 8 to avoid that the needles hit the conveyor belt 4 during penetration movement. In the drawing, the needles 7 are shown in the lower deadpoint position of their stroke.

The needle cases 8 are reciprocately moved in upward and downward direction by a common motor 10, the drive shaft of which carries two cranks 11 to which connecting rods 12 are linked by means of ball joints, said connecting rods 12 being connected to piercing frames 13,14 by means of further ball joints. Each piercing frame 13,14 is guided by bearings being stationarily relative to the frame 1, conveniently on noise-attenuating rollers 15 of synthetic plastics material, and arranged exteriorely of the vat 2, for being moved in upward and downward direction. Both piercing frames 13,14 are inclined relative to one another and respectively to a vertical line such that both piercing frames assume a V-shaped arrangement. Each piercing frame 13,14 consists of three tubes arranged in the shape of a U and is guided in the bearings 15 with the both tubes forming the legs of the U. To the horizontal transverse tube 16 of each piercing frame 13,14 there are connected distributing hoses 17 by means of connecting nipples 18, through which the brine is supplied to the hoses 17 and needles 7. The brine is fed to the tubes of each of the piercing frames 13,14 via a shut-off valve 19, noting that a separate supply system for brine is connected to each of these shut-off valves 19. Each supply system receives the brine from a storage container 20 from which brine is sucked off via a suction filter 21, said brine flowing through a pressure regulating valve 22 and a conduit 23 to a pump 24. A branch conduit 25 leads from the adjustable pressure regulating valve to a pressurized container 26 to which also the pump 24 is connected with its pressure side. A hose 27 leads from the pressurized container 26 to the shut-off valve 19. This shut-off valve 19 is controlled in a manner as it is described in the above mentioned U.S. Pat. No. 3,590,721 by a stripper which is also U-shaped and the horizontal beam of this U forms a stripper plate 28 which is to be engaged on top of the meat 5. Both legs of said U are formed of rods 29 which are equally guided for being moved in upward and downward direction on bearings 30 being stationary relative to the frame 1 and being preferably formed of rollers consisting of synthetic plastics material. The stripper is drawn in downward direction by a spring not shown or can be loaded by means of a loading weight so that the stripper, when in its lowered position, rests on the meat 5 to be pickled with sufficient downward pressure required for preventing the meat to become lifted by the needles 7 when moving the needle case 8 in upward direction. As it is also described in the U.S. Pat. No. 3,590,721, the stripper rods 29 carry an abutment 31 which cooperates with a counteracting abutment 32 of the piercing frame 13 or 14, respectively, such that the shut-off valve 19 will become opened as soon as the abutment 32 is lifted off the counteracting abutment 32. This does occur as soon as the stripper contacts the meat 5 with its stripper plate 28. The shut-off valve 19 will in its turn be kept closed as long as the abutment 31 contacts the counteracting abutment 32. This is given as long as the counteracting abutment 32 takes with it the abutment 31 and thus also the stripper rods 29. In addition, each shut-off valve 19 can also be manually closed so that the supply of brine to each piercing frame 13 or 14, respectively, can be shut off as desired.

Notwithstanding the fact that in this manner brine will be ejected from the needles 7 under pressure only if the needles have penetrated or pierced the meat 5, it can, in practice, not be avoided that a certain amount of brine ejected from the needles does not enter the meat 5. This amount of brine is collected within the collecting vat 2 having two bottoms 33, 34. The bottom 33 extends over the whole length of the machine, whereas the bottom 34 extends from the right-hand end of the machine as seen in FIG. 1 only midway between both piercing frames 13,14. The bottom 34 is arranged at a small distance above the bottoms 33, so that the interspace 35 between both bottoms 33 and 34 forms a channel for returning that amount of brine ejected by the needles of the piercing frame 13 which has not entered the meat 5. This channel 35 is connected to a return conduit 37 via a return-flow filter 36, said return conduit 37 returning the collected and purified brine into the storage container 20 appertaining to the piercing frame 13. In an analogous manner a return conduit 38 is connected to an opening of the bottom 34 collecting the brine ejected by those needles of the piercing frame 14 which have not entered the meat 5. The return conduit 38 is tightly passed through the interspace 35 and is connected to a further return-flow filter 39. To prevent the collected brine from flowing down over the front ends of the bottoms 33 and 34, each of these front ends is provided with an upwardly bent border 40 or with a transverse wall or the like so that there is prevented any loss of brine and any intermingling of the brines coming from the two piercing frames 13, 14. In this manner, brine coming from the piercing frame 13 or 14, respectively, is (with the exception of brine retained within the meat pieces 5) circulated anlong a closed path, each path being completely independent from the other. The direction of flow of the brine is indicated by arrows. This provides the possibility to use for the piercing frame 13 a brine of another quality than is the quality of the brine used for the piercing frame 14. Since one can interrupt the function of one of both piercing frames by means of the respective shut-off valve 19, there is the possibility to pickle the pieces of meat 5 with one of both kinds of brine or with both kinds of brine as desired. A piercing frame 13,14 not used can be arrested in its upper dead-point position by means of constructional parts not shown, after having loosened the coupling formed of the respective connecting rod 12 so that dead-strokes of the piercing frame 13 or 14 just not used can be avoided.

There exists also the possibility to give the crank drives 11 a shift of 180°. By this the two piercing frames 13,14 are always moved in opposing directions so that the piercing frame 13 is in its lower dead-point position and is with its needles 7 fully penetrating into the meat 5, when the piercing frame 14 is in its upper dead-point position and has its needles 7 completely extracted from the meat, and vice versa. With such an arrangement, however, a subdivided conveyor belt 4 would have to be provided within the vat 2 because the conveyor belt 4 can be advanced for one step only with the needles 7 being completely extracted from the meat 5. The stepwise movements of the two conveyor belts arranged below these piercing frames and appertaining to one piercing frame 13,14 each, would in such a case have to be effected in an alternating manner.

The embodiment shown in FIG. 3 differs from that shown in FIGS. 1 and 2 only in that the piercing frames 13, 14 are vertically arranged instead of being arranged according to a V-shaped pattern.

In both embodiments, the collecting vat 2 extends in right-hand direction over the frame 1 and thus extends over two mobile storage containers 20 for brine. By this, return of the brine flowing back through the return conduits 37, 38, respectively, into the storage containers 20 is simplified. Simultaneously, the storage containers 20 are covered on their top side and arranged at the respective front end of the machine in a space-saving and synoptical manner.

In practice it has been proved that such a machine will give good brine injection values, particularly with respect to the volume of brine injected per unit of time, even when working with a low pressure of brine. In view of the amount of brine being increasable for example by increasing the brine pressure and being high on account of the oblique arrangement and on account of the twin needle sets, the transport velocity of the meat through the device can be increased over that in known systems. When working with a low injection pressure of brine, the brine becomes well distributed within the tissue of the meat without destroying same. This is equivalent to a decrease in protein loss. Further, the danger of formation of bubbles on the surface of the material to be pickled and the danger of brine inclusions within the material to be pickled becomes reduced.

Both arrangements (FIGS. 1 and 3) have the additional advantage that a rest zone is located between both piercing frames and that in this rest zone the brine has sufficient time to become absorbed by the meat before the second piercing frame starts its work on the same piece of meat 5.

Of course, the invention is also applicable in analogous manner on devices comprising more than two piercing frames which can obliquely be arranged relative to one another or be arranged in different directions of inclination or in vertical direction.

The means by which each of the piercing frames can be locked in its upper dead-point position may comprise a hook or a stop which is fixed in the path of travel of the respective piercing frame.

What I claim is:

1. A machine for injecting a treating liquid into an edible material for the treatment thereof, comprising a frame, conveyor means extending longitudinally of said frame and defining a support surface for said edible material, at least two needle cases spaced from each other and mounted on said frame and being movable in guided relation in an upward and downward direction with respect to said support surface, motor means mounted on said frame and being interconnected to said needle cases for effecting the movement thereof, an injection needle set resiliently mounted on each of said needle cases for movement therewith and being movable into penetrating relation with the edible material as said edible material is transported transversely with respect to the path of said needle cases by said conveyor means, a separate treating liquid supply system associated with each of said needle sets, each of said treating liquid supply systems including a separate treating liquid storage tank that is located adjacent to the bottom of the frame, a conduit extending from each storage tank to the respective needle set for conducting treating liquid thereto, a separate pump interconnected in each treating liquid supply system for directing the treating liquid from the respective storage tank to the needle set thereof, and a separate liquid circuit for each liquid supply system for recycling the treating liquid that is ejected from said needle sets but that fails to be injected into said edible material, each of said circuits including a collecting means for receiving the unused treating liquid that fails to be injected into said edible material and a return conduit communicating with the collecting means and the storage tank of the associated liquid sypply system, the collecting means for said circuits including a vat that is mounted on said frame in surrounding relation with respect to said conveying means, said vat including spaced side walls, end walls and a pair of horizontal and parallel bottom walls that are located in spaced vertical relation between said side walls, the lowermost of said bottom walls extending for the length of said vat, the uppermost of said bottom walls being foreshortened with respect to the lowermost bottom wall and the forwardmost end of said uppermost bottom wall being located between said needle sets, wherein only one of said needle sets directly overlies one of said bottom walls, said bottom walls defining an interspace therebetween that forms a channel that communicates with one of said return conduits, said one return conduit directing unused liquid collected by said lowermost bottom wall to the storage tank in circuit therewith, the other of said return conduits communicating with said uppermost bottom wall for directing unused liquid collected by said uppermost bottom wall to the storage tank in circuit therewith.

2. A machine as claimed in claim 1 wherein all of said storage tanks for treating liquid are arranged at the same end of said frame and said storage tank further include a filter means inserted into each of said return conduits.

3. A machine as claimed in claim 1, where in each treating liquid supply system is provided with a separate adjustable pressure control means for adjusting the pressure of the treating liquid.

4. A machine as claimed in claim 1, further comprising means for keeping each injection needle set independently from the other injection needle set in its lifted position, and means for closing each treating liquid conduit independently from the other treating liquid conduit.

5. A machine as claimed in claim 4, wherein said means for independently closing each treating liquid conduit comprises a valve inserted in said conduit.

* * * * *